(12) United States Patent
Entelmann et al.

(10) Patent No.: US 6,454,211 B2
(45) Date of Patent: Sep. 24, 2002

(54) STRUCTURAL COMPONENT PARTICULARLY FOR AN AIRCRAFT

(75) Inventors: Wolfgang Entelmann, Lilienthal; Otto Mester, Axstedt; Ulf Karnath, Halstenbek, all of (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/740,491

(22) Filed: Dec. 18, 2000

(30) Foreign Application Priority Data

Dec. 16, 1999 (DE) .......................................... 199 60 734
Mar. 16, 2000 (DE) .......................................... 100 12 906

(51) Int. Cl.⁷ ................................................ B64C 1/14
(52) U.S. Cl. ........................... 244/129.5; 244/129.4; 244/119
(58) Field of Search ........................... 244/119, 117 R, 244/126, 129.4, 129.5, 132

(56) References Cited

U.S. PATENT DOCUMENTS

| | | | | |
|---|---|---|---|---|
| 2,349,907 A | * | 5/1944 | Kos et al. ............... | 189/46 |
| 2,352,296 A | * | 6/1944 | Szego ..................... | 114/83 |
| 3,071,217 A | * | 1/1963 | Gould .................... | 189/34 |
| 4,035,536 A | * | 7/1977 | Morrison ................ | 428/118 |
| 4,557,440 A | * | 12/1985 | Adams ................... | 244/129.4 |
| 4,662,556 A | | 5/1987 | Gidlund | |
| 5,242,523 A | * | 9/1993 | Willden et al. .......... | 156/285 |
| 5,262,220 A | * | 11/1993 | Spriggs et al. .......... | 428/156 |
| 5,667,169 A | * | 9/1997 | Erben et al. ............. | 244/129.5 |
| 6,213,426 B1 | * | 4/2001 | Weber et al. ............ | 244/117 R |

FOREIGN PATENT DOCUMENTS

DE 3438584 5/1985

OTHER PUBLICATIONS

Technical Data Sheet, "One Piece Cast Door", AHI Data Sheet; Aluvic Hitchcock International; Boeing 757 aircraft cabin door, 1997.*

* cited by examiner

Primary Examiner—Michael J. Carone
Assistant Examiner—Gabriel S Sukman
(74) Attorney, Agent, or Firm—W. F. Fasse; W. G. Fasse

(57) ABSTRACT

A structural component for example an aircraft door or aircraft body section is cast of lightweight metals as an integral structure with an outer skin reinforced by stiffening ribs forming a first grid structure and by stiffening walls forming a second gird structure integrally connected to the first grid structure as a result of casting. The side opposite the skin on the second grid structure is preferably covered by a further inner skin, for example secured by casting or by an adhesive.

18 Claims, 10 Drawing Sheets

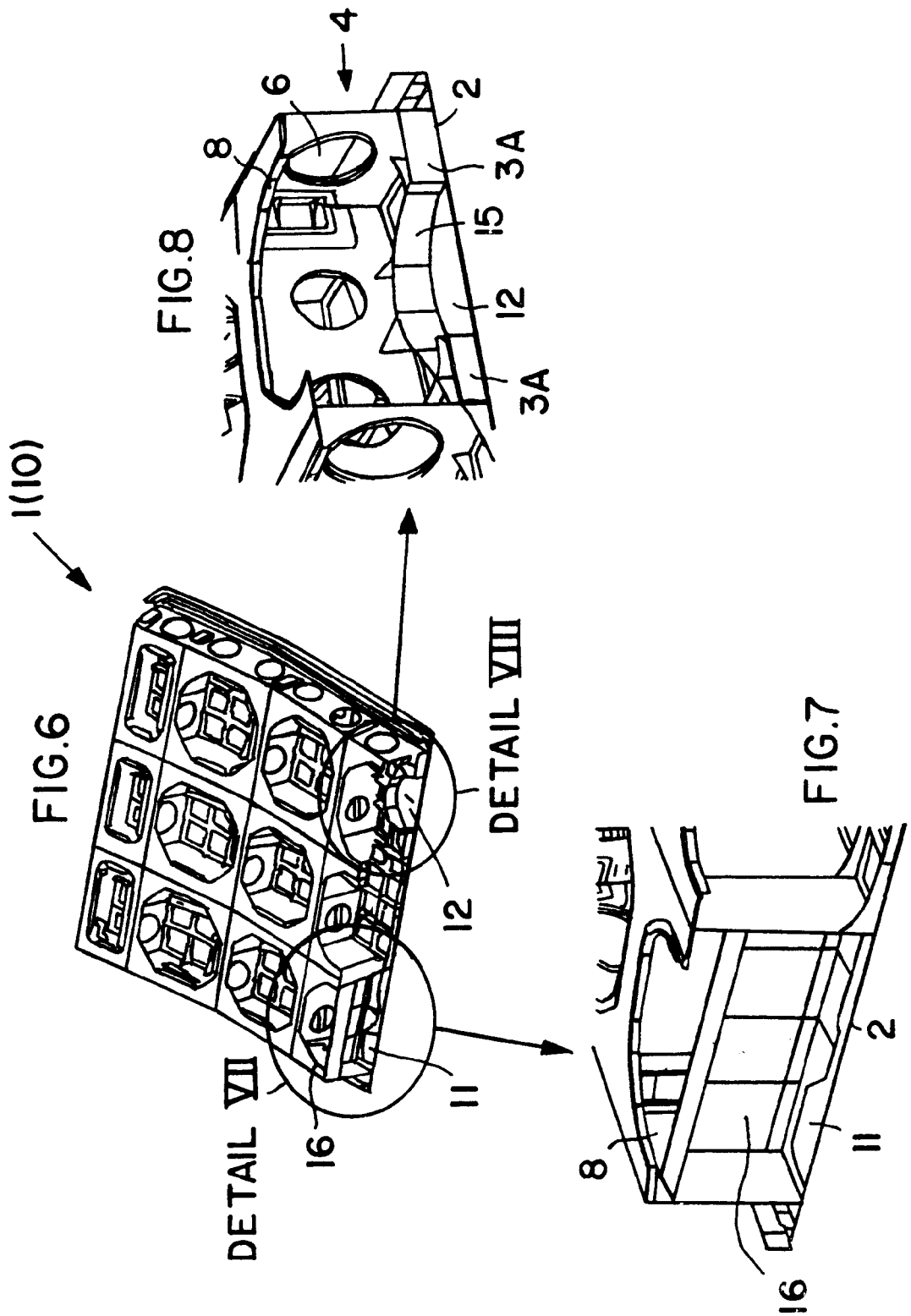

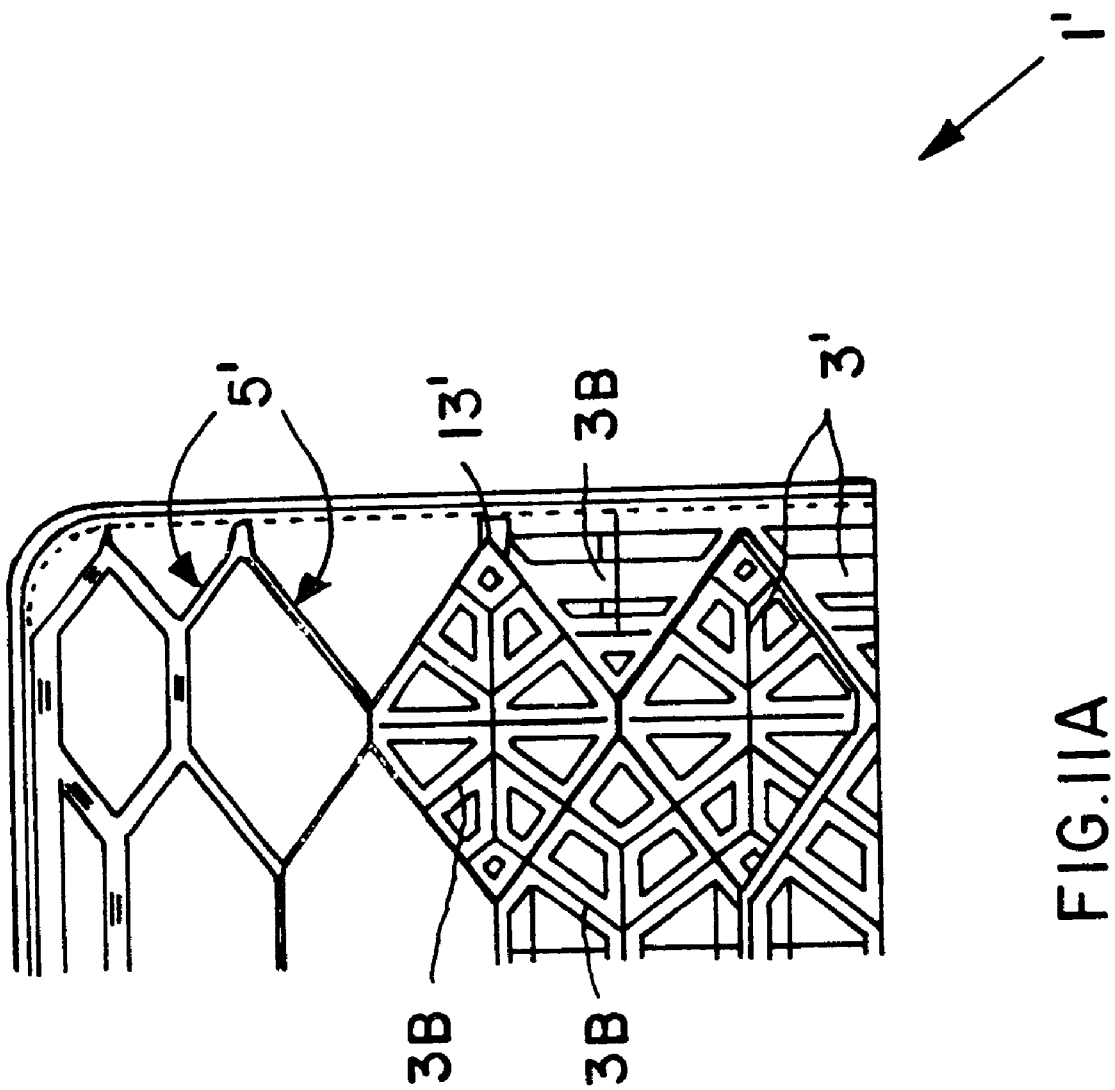

STRUCTURAL COMPONENT PARTICULARLY FOR AN AIRCRAFT

PRIORITY CLAIM

This application is based on and claims the priority under 35 U.S.C. §119 of German Patent Applications 199 60 734.6, filed on Dec. 16, 1999, and 100 12 906.4, filed on Mar. 16, 2000, the entire disclosures of which are incorporated herein by reference.

FIELD OF THE INVENTION

The invention relates to large surface area structural components such as an aircraft doors, aircraft body sections having an outer skin reinforced by stiffening elements.

BACKGROUND INFORMATION

Conventionally, large surface area load carrying structural components for an aircraft are manufactured by riveting techniques and to some extent also by adhesive bonding techniques. An initially separate outer skin is riveted or adhesively bonded to a frame structure, more specifically to flanges of ribs forming the frame structure. Such structural components are, for example disclosed in German Patent Publication DE 34 38 584. Manufacturing such large surface area components is quite involved and expensive because securing the skin to the primary support frame requires setting a large number of rivets. The riveting itself requires a multitude of work steps such as drilling through the skin and through the flanges of the frame structure, setting sealing means, supplying the rivets, inserting the rivets into the drilled holes and finally setting the rivets and smoothing the outer skin surface so that the rivet heads do not increase drag.

Furthermore, a primary structural component such as an aircraft fuselage section must be capable of taking up pressure differentials between the inside of an aircraft and the outside thereof. For this purpose, stiffening elements must be provided to take up these pressure differentials. Each section, be it a door or a portion of the fuselage, must be provided with connector elements for connecting one section to the next which again increases the manufacturing effort and expense.

It is further disadvantageous that conventional frame structures, due to the materials of which the frame structures are made, and due to the required stiffening components have a high weight. Reducing such weight is an everlasting goal in aircraft construction.

OBJECTS OF THE INVENTION

In view of the above it is the aim of the invention to achieve the following objects singly or in combination:

- to dimension and construct a structural large area component in such a way that it can take up the required high loads that occur in an aircraft while simultaneously reducing the weight of such structural components or at least not increasing the weight while increasing the load capacity;
- to reduce the manufacturing effort and expense of such large surface area structural aircraft components;
- to construct the large surface area structural component of an aircraft as an integral cast component that does not require any separate frame structures nor any riveting flanges;
- to incorporate into such large surface area structural components recesses and/or housings for the installation of secondary structural elements such as windows, door handles, and other secondary structural elements;
- to increase the stiffness of such large surface area components compared to the stiffness of conventional components having a skin riveted to a frame; and
- to design the individual elements of the present component so that all elements can be cast simultaneously to form an integral structure in which all the elements are secured to each other as a result of the casting.

SUMMARY OF THE INVENTION

A large surface area structural component according to the invention is characterized in that a skin and reinforcing elements are integrally cast with the skin so that the reinforcing elements are rigidly secured to the skin or vice versa as a result of the casting to form an integral structure capable of taking up forces for example caused by a pressure difference on opposite sides of the structural component.

More specifically, the reinforcing elements comprise stiffening ribs that form a first grid structure integrally cast with the skin, whereby the skin closes one large surface area side of the first grid structure. The reinforcing elements further comprise stiffening walls interconnected with one another to thereby form a stiffening second grid structure. Cast junctions interconnect the second grid structure to the first grid structure opposite the skin. The skin forms for example an outer skin of an aircraft body or aircraft component such as an aircraft door. An inner skin may be secured to the second grid structure opposite the outer skin. The inner skin may also be cast with the other elements of the structure or it may be adhesively bonded to the second grid structure.

It is a particular advantage of the invention that the integrally cast structure according to the invention achieves a higher stiffness compared to conventional riveted structures capable of taking up differential pressures. Further, the casting substantially reduces the manufacturing effort and expense while simultaneously optimally reducing the weight of such structures, since riveting flanges are avoided.

Casting the outer skin together with its reinforcing stiffening first grid structure and second grid structure makes it possible to construct, for example aircraft body sections of larger size than heretofore as far as the surface area of these body sections is concerned.

By making the stiffening ribs of the first stiffening grid structure next to the skin and the stiffening walls of the second grid structure next to the stiffening ribs congruent in their cross-sectional configurations, integral casting becomes possible and the stiffness of the component is increased. By "congruent" is meant in this context that a polygonal sectional configuration, parallel to the outer skin, of a grid field of the second grid structure fits onto at least one polygonal sectional configuration of a grid field of the first structure. Preferably one grid field of the second grid structure fits onto several grid fields of the first grid structure. This means that the first grid structure preferably has more grid fields than the second grid structure.

The inner skin contributes to the stiffness of the structure and if cut-outs are provided in the inner skin and/or in the stiffening walls of the second grid structure, further weight reductions are achieved.

By reinforcing the cross-section along the rims of the cut-outs, the stiffening is further improved without the need of additional stiffening components. The reinforced rims around the cut-outs require less weight than additional reinforcing elements in conventional structures which have been eliminated according to the invention.

By making the above mentioned polygonal cross-sectional configurations of the second grid structure congruent to a plurality of cross-sectional polygonal configurations of the first grid structure and the use of casting techniques becomes possible and additionally, the resulting structure is symmetrical relative to several axes such as the longitudinal aircraft axis and radial axes so that an economical production of the casting tools is possible.

The congruent sectional configurations may have any polygonal configuration, whereby even a triangular section is considered to be a polygonal configuration which also includes rectangles, squares, hexagonal configurations and any other suitable polygonal configurations. All these polygonal sectional configurations are taken as sections in a plane substantially parallel to the outer skin.

The present large surface area components are suitable for making aircraft body sections, aircraft doors, cargo bay closures, and access flaps and the like.

Due to the symmetric configuration and due to the congruent shape of the first and second grid structures it is possible to employ sand casting, high precision casting, or pressure casting for producing the present components of lightweight metals and metal alloys suitable for casting such as aluminum, magnesium and titanium and alloys thereof.

BRIEF DESCRIPTION OF THE DRAWINGS

In order that the invention may be clearly understood, it will now be described in connection with example embodiments, with reference to the accompanying drawings, wherein:

FIG. 6 is a view similar to FIG. 1, but showing detail circles VII and VIII;

FIG. 7 shows on an enlarged scale, compared to FIG. 6, the detail VII of FIG. 6;

FIG. 8 shows on an enlarged scale, compared to FIG. 6, the detail VIII of FIG. 6;

FIG. 11A shows a plan view of a portion of a door structure according to the second embodiment of the invention with hexagonal grid configuration and further illustrating secondary ribs.

DETAILED DESCRIPTION OF PREFERRED EXAMPLE EMBODIMENTS AND OF THE BEST MODE OF THE INVENTION

Figure 1:
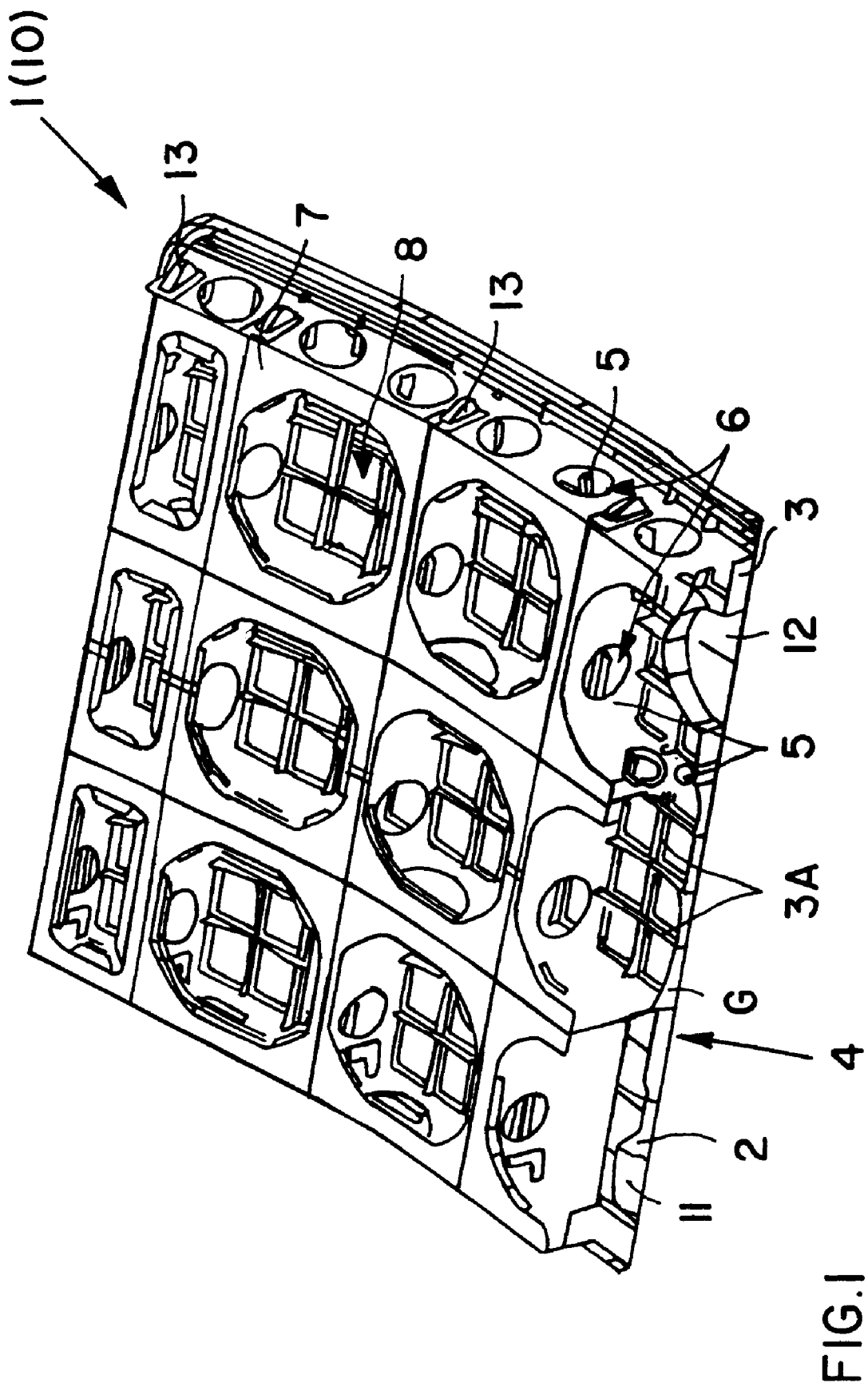
FIG. 1 is a perspective view of a structural component, partially broken away, of a first embodiment according to the invention with a cast stiffening structure having stiffening ribs and stiffening walls.

FIG. 1 shows a structural component 1 particularly suitable for use as an aircraft structural component capable of taking up differential pressures between the inside and outside of an aircraft. The structural component 1 has a large surface area suitable, for example, to become part of an aircraft body or fuselage, or a door, a closure flap, or a cargo bay closure. The component 1 is slightly vaulted relative to a longitudinal central aircraft body axis not shown. More specifically an outer skin 2 is slightly convex radially outwardly and an inner surface of the structural component is slight concave to merge into an aircraft body structure. A first grid structure 3 formed by stiffening reinforcing ribs 3A is integrally cast with the outer skin 2. A second grid structure 4 formed by stiffening reinforcing walls 5 is integrally cast with the first grid structure 3. For this purpose both grid structures 3 and 4 have polygonal sectional configurations, whereby even a triangular configuration is considered to be polygonal. In the first embodiment the sectional polygonal configuration in a plane parallel to the outer skin 2 of the first grid structure 3 is rectangular or square. One surface side of the grid structure 3 is closed by the outer skin 2. The other side of the first grid structure is integrally connected by casting to the second grid structure 4. The grid fields of the first grid structure 3 are smaller in area than the area of a grid field of the second grid structure 4. However, these grid field areas are so related to each other that, for example, one square grid field of the second grid structure is congruent to twelve grid fields of the first grid structure. This construction increases the overall symmetry of the present structural components and facilitates the integral casting of the outer skin, the first grid structure and the second grid structure.

A second embodiment shown in FIG. 9 will be described in more detail below. However, it should be mentioned here that the first grid structure 3' and the second grid structure 4' of the second embodiment have hexagonal sectional configurations to again be congruent with one another. The first hexagonal grid configuration 3' is cast integrally with the skin 2' and the second grid configuration 4' is cast integrally with the first grid configuration 3'.

In both embodiments the first grid configurations 3, 3' provide the required stiffness for the skin 2, 2' against deformations that may be caused by radially effective loads for example due to differential pressures inside and outside of an aircraft. The first grid structure 3, 3' is formed by ribs 3A, 3A' which may, for example be simple lands without riveting flanges, whereby the rib dimension or rib height perpendicularly to the skin 2, 2', is selected in accordance with the stiffness requirements of the skin 2, 2'.

The second grid structure 4, 4' is formed by reinforcing stiffening walls 5, 5'. These walls are arranged rectangularly in the first embodiment to form a box frame. In the second embodiment the box frame is formed by hexagonal boxes. The walls forming the box frame are spaced from one another at a spacing that is larger than the spacing between the ribs 3A, 3A'.

The second grid structure extends also perpendicularly to the skin 2, but the walls 5, 5' have a dimension perpendicularly to the skin 2 that is larger than the rib height of the first grid structure. The wall height will be selected with due regard to the required overall stiffness of the structural component. The walls 5 are preferably provided with the cut-outs 6 for weight reduction. An inner skin 7 is preferably arranged on the walls 5, 5' forming the second grid structure 4, 4'. The inner skin 7 faces inwardly and extends substantially in parallel to the outer skin 2. Preferably, the inner skin 7 is also provided with the cut-outs 8 for weight reduction on the one hand and for accessability into the structural component as will be described in more detail below.

The edges or rims of the cut-outs 6 and 8 are preferably reinforced as shown at 6A and 8A. The first grid structure and the second grid structure are integrally cast so that riveting connections are avoided. The inner skin 7 may be secured to the second grid structure by casting or adhesive bonding. The conventional casting methods that are preferred for the casting of the structural components according to the invention is the sand casting method, or the precision lost wax casting method, or the pressure casting method. Metals suitable for the present purposes are aluminum, magnesium, or titanium, preferably alloys of these lightweight metals.

Figure 2:
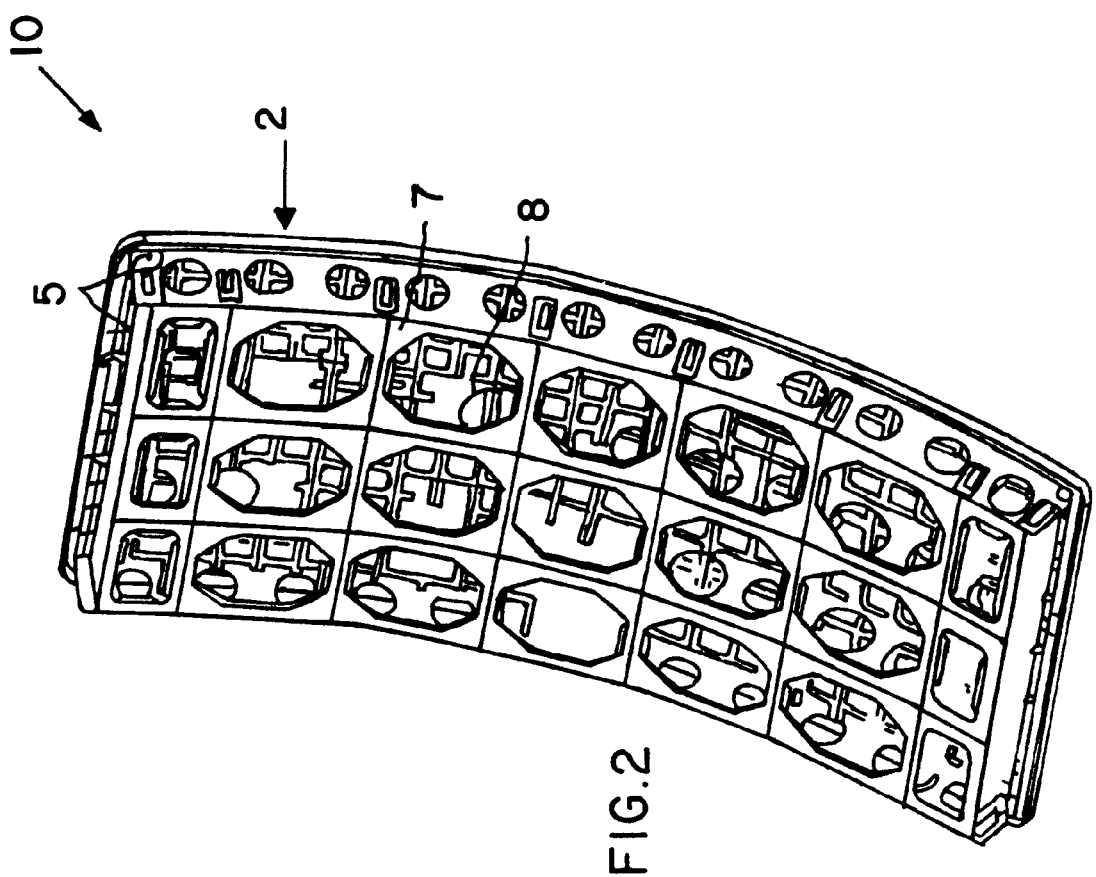
FIG. 2 is a view similar to that of FIG. 1, but showing the core of an aircraft door according to the invention.

FIG. 2 shows the structural component according to the invention as a passenger door of an aircraft in a perspective view. The typical size of such a cast application is about 2.2 m height and 1.3 m width. The present structural component is particularly advantageous in its use as a passenger door 10 because the stiffening grid structures 3 and 4 achieve a homogeneous structural stiffening which results in a homogeneous force distribution resulting in an optimal force flow through the door. This advantage is particularly important in the transition area between the door 10 and a door frame not shown. Another advantage is seen in that due to the symmetric rectangular configuration of the reinforcing first and second grid structures recesses and openings can easily be made to install secondary components such as a door opening mechanism. An emergency chute, actuators and drive motors for the door and the chute, are all components that are conveniently integrated into the present aircraft door 10. Another advantage is seen in that due to the casting certain functional components can be directly formed during the casting step, for example a window frame or a portion of a window frame or a housing for mounting a secondary component in the door may be directly cast into the door structure.

Figure 3:
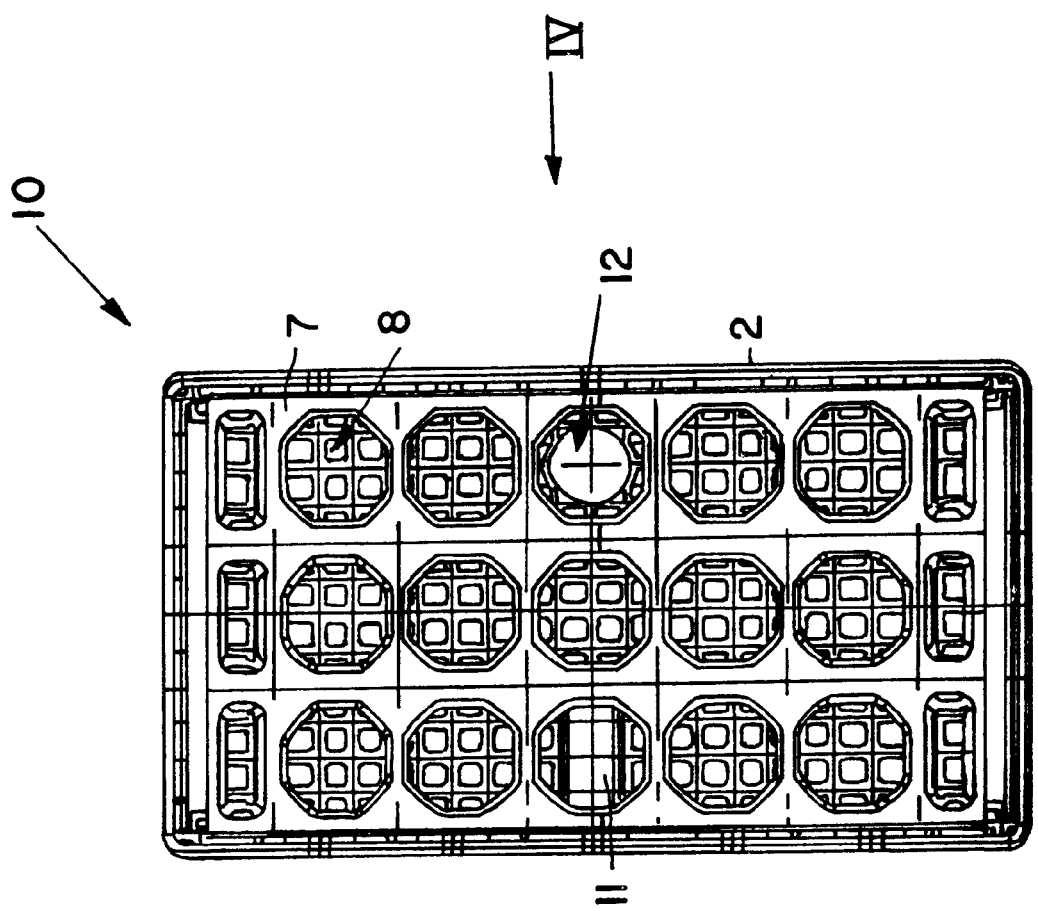
FIG. 3 shows a plan view onto the inner side of the aircraft door of FIG. 2 provided with an inner skin having for example octagonal cut-outs in the inner skin.
Figure 4:
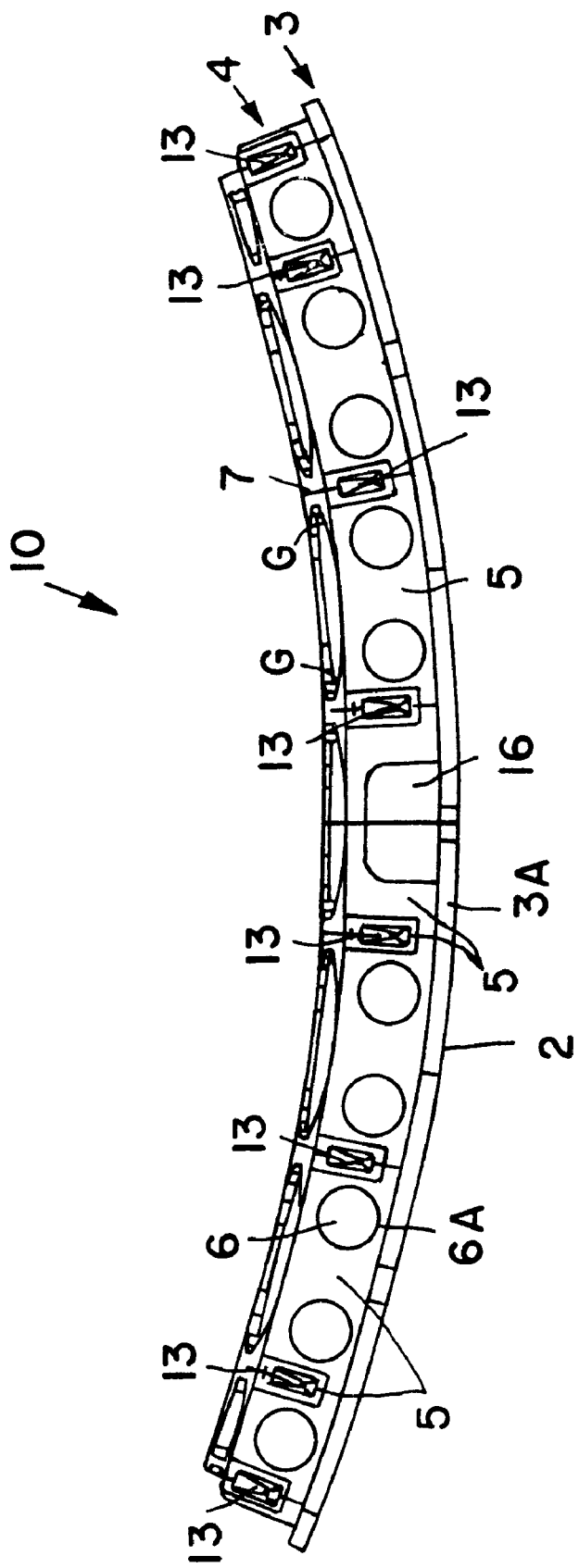
FIG. 4 shows a side view of the aircraft door in the direction of the arrow IV in FIG. 3.

FIGS. 3 and 4 show further views of the door 10, whereby FIG. 3 is a plan view onto the inner skin 7 of the door. Due to the rectangular, symmetric arrangement of the stiffening grid structures 3 and 4, additional components may be installed in the door such as bearings, mounting brackets, hinges and the like, whereby these additional installation components or elements are easily connected to the cast core structure of the door and an exchange in the case of repairs is easily accomplished. A recess or hole 11 may be provided to form a housing 16 for an installation component such as a door opener or the like. An opening 12 may be provided to form a window in the door 10.

FIG. 4 shows a side view of the passenger door 10 as viewed in the direction of the arrow IV in FIG. 3. The outer skin 2 and the stiffening grid structure 3 have an outwardly convex configuration. The walls 5 form the second grid structure 4 that is integrally cast with the first grid structure. The first and second grid structures 3 and 4 extend substantially perpendicularly to the inwardly facing surface of the outer skin 2 and thus radially relative to a central longitudinal aircraft body axis not shown. The dimension of the ribs 3A and of the walls 5 and their arrangement will be calculated in accordance with the requirements for the structural component 1. These requirements depend on the loading, on the size of the aircraft, as well as the connection of the individual sections of the structural component to the entire structure such as the entire aircraft body, whereby conventional calculation methods are employed, for example the so-called finite elements method. FIG. 4 also shows force introduction members 13 that are preferably connected to the walls 5 for load introduction into the door 10.

Figure 5:
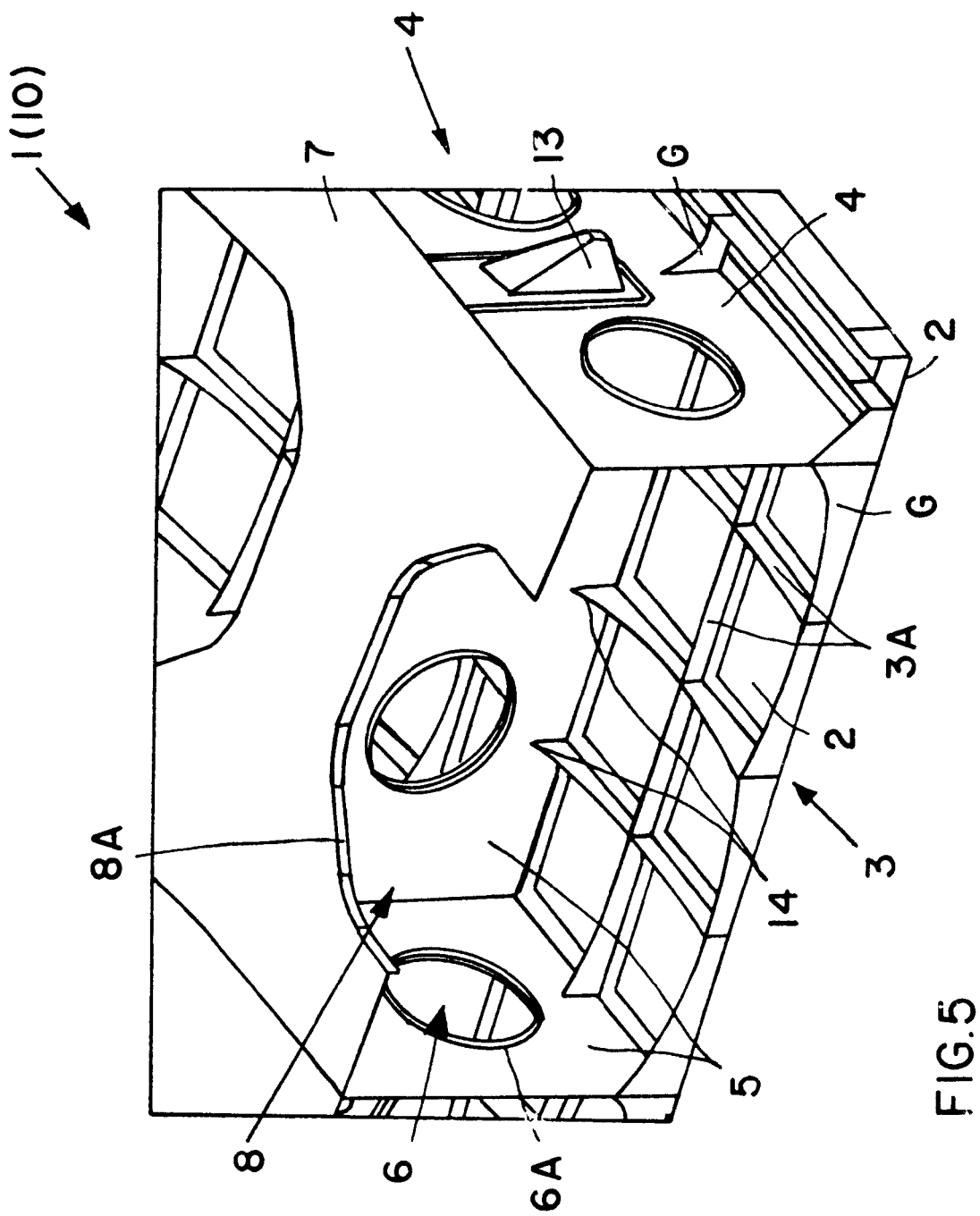
FIG. 5 is a perspective enlarged partially cut-away view of the structural component of present FIG. 1 with a first grid structure formed by stiffening ribs and a second grid structure formed by stiffening walls.

FIG. 5 shows on an enlarged scale in a perspective view further details of the present structure. Ribs 3A that cross each other form the first grid structure 3. Walls 5 that cross each other form the second grid structure 4. The walls 5 are connected integrally with the length of certain of the ribs 3A by casting. Certain other ribs 3A are only connected with their ends to the sides of the walls 5 by the casting. Gussets G are provided at the junctions between the ends of certain of the ribs 3A with the walls 5. These gussets have a curvature 14 which is selected with due regard to casting technical requirements. The wall thickness of the skin 2, the dimensions of the ribs 3A and of the walls 5 can be optimally designed in accordance with casting techniques. Thus, further weight reductions can be achieved by minimizing the dimensions in those areas where loads are minimal. As shown, a cross-sectional area of four walls 5 forming boxes in the second grid structure 4 have a surface area in a section parallel to the skin 2 that is congruent to the sum of twelve surface areas in the first grid structure 3.

As an example, the outer skin 2 has preferably a thickness of about 1.5 mm on average. However, a larger wall thickness may be employed in areas where larger loads may occur to assure the required load bearing capacity, for example at the junctions of the ribs 3A and at the junctions between the ribs 3A and the walls 5. At these junctions, the outer skin 2 preferably has a thickness up to 2 mm. In areas where a load introduction element 13 is secured to the second grid structure, the thickness of the skin 2 may be up to 8 mm. These required increased wall thicknesses of the skin 2 are more than compensated by the cut-outs or openings 6 in the walls 5 and cut-outs or openings 8 in the inner skin 7. Preferably, the cut-outs 6 have a reinforced rim 6A. Similarly, the cut-outs 8 have a reinforced rim 8A. The size of these cut-outs will be selected as large as possible, whereby the reinforced rims 6A and 8A are merely slightly increased wall thicknesses around the cut-outs 6 and 8.

Referring to FIGS. 6, 7 and 8 in conjunction, FIG. 6 shows a detail circle VII and a detail circuit VIII. FIGS. 7 and 8 illustrate the respective details. FIG. 7 shows on an enlarged scale the detail VII as a recess or hole 11 for the installation of a door opening mechanism and lock in a housing 16 formed in the cast core structure of the door. The recess 11 is open through a hole in the skin 2. The housing 16 for an opening mechanism not shown extends with its housing length horizontally through the door 10. Thus, the housing 16 stiffens the door against bending the door in this area. FIG. 8 shows on an enlarged scale the detail VIII in which a hole 12 is provided for a window in the door 10. The hole 12 is surrounded by a frame 15 which is integrated into the first grid structure 3 and to the extent necessary into the second grid structure 4 in accordance with casting technical principles.

Figure 9:
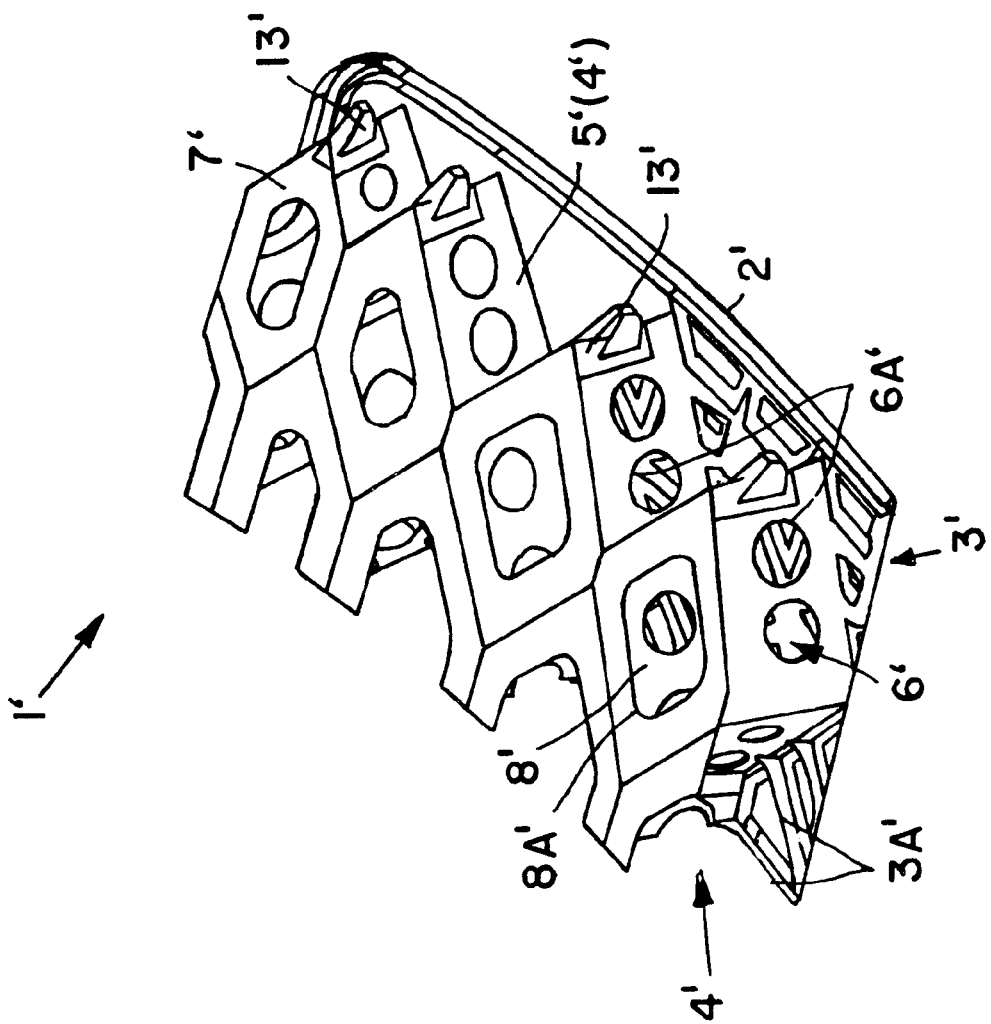
FIG. 9 is a perspective cut-away view of a second embodiment according to the invention wherein the sectional surfaces parallel to the outer skin of the reinforcing or stiffening first and second grid structures are hexagonal.

FIG. 9 is a perspective view similar to that of FIG. 5, however showing instead of the rectangular or square cross-sectional configurations of the first and second grid structures, a structural component 1' with first and second grid structures 3' and 4' having a hexagonal cross-sectional configuration in a plane parallel to the cover skin 2. Thus, the structural component 1 has a honeycomb shaped stiffening structure. Ribs 3A' form the first grid structure 3'. Walls 5' forms the second grid structure 4'. The honeycomb hexagonal reinforcing or stiffening structure of the component 1' is particularly advantageous for load introductions into the component 1'. The hexagonals have sides of different length. However, load introduction elements 13' are preferably positioned where a pointed tip of any hexagonal configuration box is formed. The cut-outs 6' and 8' again have reinforced rims 6A' and 8A' respectively.

Figure 10:
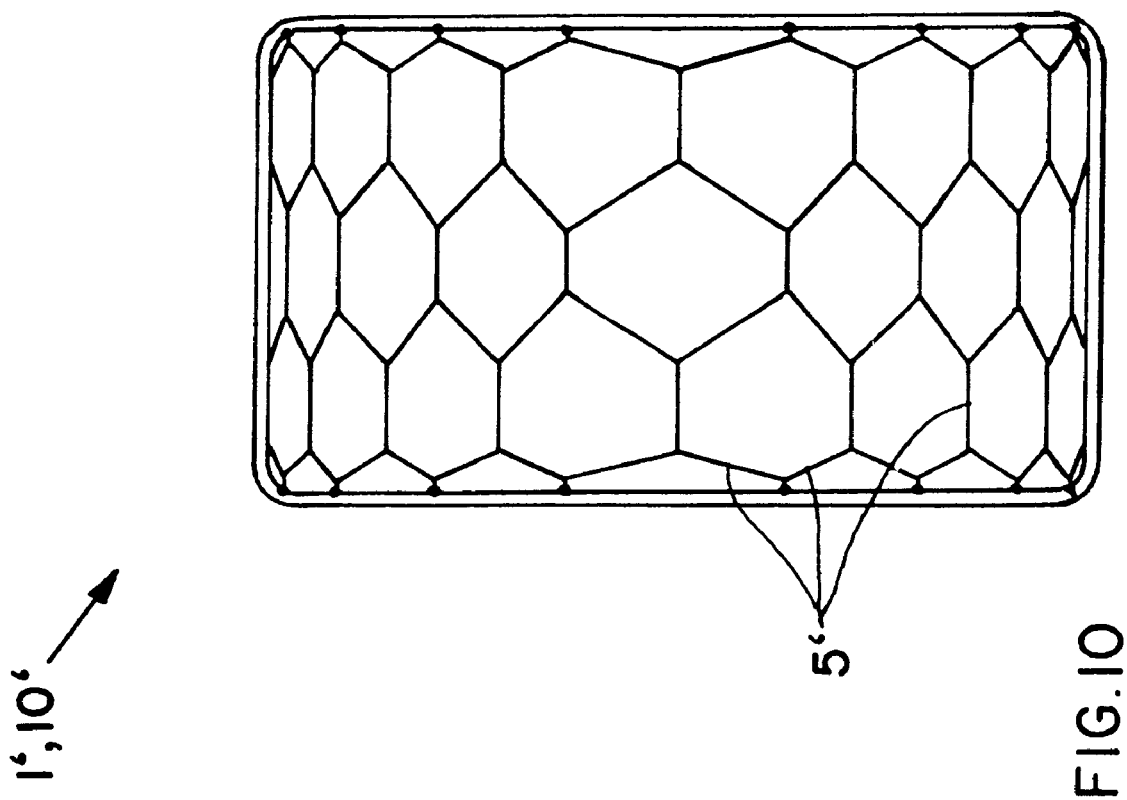
FIG. 10 is a plan view onto the inside of an aircraft door having hexagonal stiffening grid structure configurations, whereby the different shown shapes of the hexagonal configurations are adapted to casting requirements with due regard to the inwardly concave shape of the door.

FIG. 10 shows a plan view of an aircraft door 10' designed in accordance with casting technical requirements, whereby the sides of the hexagonals assume different length and different shapes to also accommodate the curvature or vaulting of the door 1', 10'. These hexagonal configurations can be referred to as "distorted" which assures an optimal load introduction into the door structure. The size of the stiffening walls 5' and of the ribs 3A' and thus of the skin stiffening first grid structure 3' will again be selected in accordance with the load requirements to which the particular door will be exposed in use.

Figure 11:
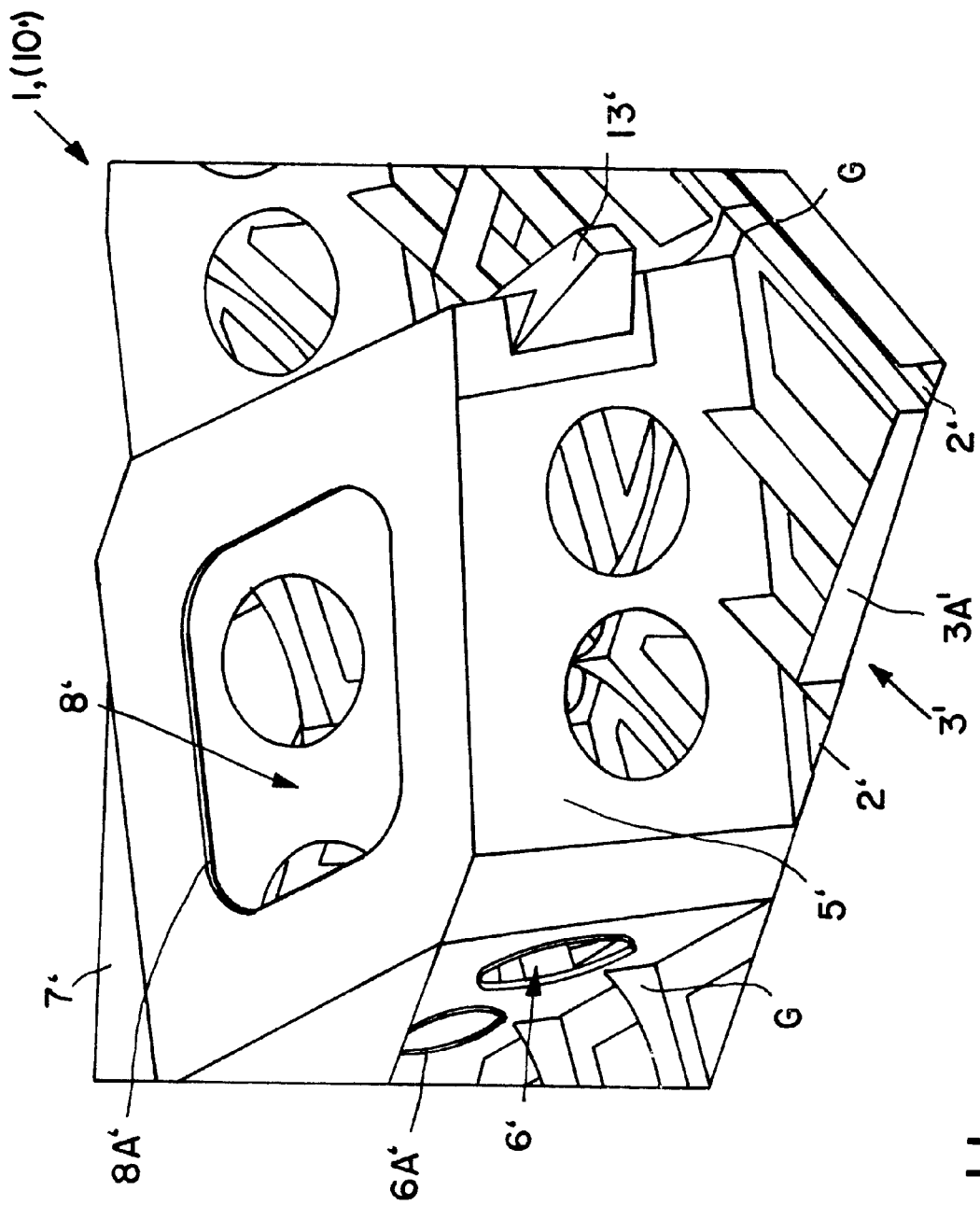
FIG. 11 is an enlarged view similar to that of FIG. 5 partially broken away to illustrate the hexagonal cross-sectional configurations of the first and second grid structures and also illustrating secondary ribs connected with their ends to walls of the second grid structure.

FIG. 11 shows on an enlarged scale structural details of the structural component 1' or rather the door 10' similar to FIG. 9. Here again the skin 2' is an integral component with the ribs 3A' forming the first grid structure 3'. The surface area or rather the cross-sectional surface area of the hexagonal honeycomb structure is congruent to the cross-sectional surface area of several hexagons of the first grid structure. Each hexagon of the first grid structure includes, for example, ten polygons formed by secondary ribs 3B best seen in FIG. 11A.

The ribs that bound the larger hexagon including several smaller polygons are connected lengthwise integrally with the walls 5' as a result of the casting. The other or secondary ribs 3B are joined to the walls 5' at the rib ends where again gussets G are formed as described above. The skin 2', the ribs 3A', the secondary ribs 3B and the walls 5' are all integrally cast to form a unitary structure that does not require any riveting and the ribs 3A' do not require any flanges for a riveting operation.

FIG. 11A shows an example of the arrangement of the first skin stiffening grid structure 3', whereby it is essential for an advantageous force flow in the structural component that the structure is as much symmetric as possible relative to several axes as mentioned above in order to have a configuration that is fully designed with due regard to casting technical considerations so that casting may be economically and advantageously performed. The walls 5' form, as mentioned, the second grid structure 4'. The hexagonal configurations may also be referred to as rhombic configurations wherein the first grid structure 3' has the secondary ribs 3B that enclose various polygon configurations such as triangles, irregular quadrangles, pentagons and the like. The sum total of these surface areas enclosed by the secondary ribs 3B is congruent to the cross-sectional surface of the respective hexagon of the second grid structure 4' formed by the stiffening walls 5'. Referring again to FIG. 11, the walls 5' are provided with the cut-outs 6' having reinforced ribs 6A'. Similarly, the inner wall or skin 7' is provided with cut-outs 8' having reinforced rims 8A'.

Other sectional configurations of the first grid structure and the second grid structure are possible. For example, a hexagonal with sides of equal length may be formed by the walls 5, 5' and by the ribs 3 and 3A'. In all instances the skin stiffening first grid structure and the structure stiffening second grid structure will be constructed for achieving the large surface area structural configuration and with due regard to technical casting requirements while simultaneously achieving the desired load distribution and parameter requirements such as the integration of the secondary components into the structural component as described above and with due regard to the integration of the structural component sections into the body of an aircraft.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A structural component comprising a skin and reinforcing elements integrally cast with said skin, so that said reinforcing elements are rigidly secured to said skin to form an integral structure capable of taking up forces caused by a pressure difference on opposite sides of said structural component, wherein said skin is part of an outer skin of an aircraft body and said reinforcing elements form an integral stiffening structure to which said outer skin (2) is attached by casting, and wherein said reinforcing elements comprise stiffening ribs (3A, 3A') extending normal to said outer skin, said stiffening ribs forming a first skin stiffening grid structure (3, 3') integrally cast with said outer skin (2), said outer skin closing said first grid structure (3) on one side surface, stiffening walls (5, 5') extending normal to said outer skin (2), said stiffening walls (5, 5') being interconnected with one another and with said outer skin (2) by casting, said stiffening walls (5, 5') forming a stiffening second grid structure (4, 4'), and cast junctions connecting said second grid structure (4, 4') to said first grid structure (3, 3') and to said outer skin (2), wherein said stiffening ribs (3A, 3A') have a first height perpendicularly to said outer skin (2), wherein said stiffening walls (5, 5') have a second height perpendicularly to said outer skin (2), and wherein said first height is smaller than said second height.

2. The structural component of claim 1, comprising a vaulted configuration relative to a central longitudinal axis of an aircraft body, said vaulted configuration having a radius of curvature corresponding to a curvature radius of said aircraft body, so that said structural component can be part of said aircraft body and is capable of taking up a pressure differential between inside and outside of said aircraft body.

3. The structural component of claim 1, further comprising an inner skin covering said stiffening second grid structure opposite said outer skin.

4. The structural component of claim 3, further comprising cut-outs in at least one of said stiffening walls and said inner skin for weight reduction.

5. The structural component of claim 4, wherein said cut-outs comprise reinforced rims.

6. The structural component of claim 1, wherein said first grid structure and said second grid structure form sectional polygonal configurations in a section plane through said and second grid structures extending in parallel to said outer skin.

7. The structural component of claim 6, wherein said sectional polygonal configurations of said first and second grid structures are configurations having at least three corners.

8. The structural component of claim 1, further comprising as part of said second grid structure at least one mounting member rigidly secured to said second grid structure for providing load introduction points in said structural component.

9. The structural component of claim 1, further comprising an opening or recess within said structural component.

10. The structural component of claim 9, wherein said opening or recess has a wall to form a housing for mounting auxiliary elements in said housing.

11. The structural component of claim 1, wherein said structural component is an air craft door.

12. The structural component of claim 1, wherein said structural component is made lightweight metals selected from the group consisting of aluminum, magnesium, titanium and alloys of aluminum, magnesium and titanium.

13. The structural component of claim 1, wherein said cast junctions comprise gussets between said first grid structure and said second grid structure.

14. The structural component of claim 1, wherein said ribs of said first grid structure form first polygonal grid fields, wherein said walls of said second grid structure form second polygonal grid fields larger in area than areas of said first polygonal grid fields so that each of said second polygonal grid fields is congruent to at least two of said first polygonal grid fields, whereby casting of said outer skin (2), said first grid structure and said second grid structure as a single integral component is facilitated.

15. The structural component of claim 14, wherein said stiffening ribs are wide next to said outer skin and taper toward said junctions with said stiffening walls.

16. The structural component of claim 1, wherein said first grid structure and said second grid structure together form a multibox frame which is closed on one side by outer skin.

17. The structural component of claim 1, wherein said stiffening ribs of said first grid structure comprise first ribs having a length rigidly connected to said stiffening walls as a result of casting, and wherein said stiffening ribs of said first grid structure further comprises second ribs having ends rigidly connected to said stiffening walls as as a result of casting.

18. The structural component of claim 1, wherein said structural component is an sircraft body component having a vaulted configuration relative to a longitudinal central axis of said aircraft body.

* * * * *